United States Patent [19]

Esterle

[11] Patent Number: 5,316,483

[45] Date of Patent: May 31, 1994

[54] GEOMETRIC DISPLAY DEVICE AND METHOD OF DEMONSTRATING GEOMETRIC SHAPES

[76] Inventor: Richard B. Esterle, 605 E. 11th St. - Apartment 1A, New York, N.Y. 10009

[21] Appl. No.: 15,777

[22] Filed: Feb. 10, 1993

[51] Int. Cl.⁵ .......................................... G09B 23/04
[52] U.S. Cl. .................................................. 434/211
[58] Field of Search .................. 434/211, 83; 446/119, 446/126

[56] References Cited

U.S. PATENT DOCUMENTS

| | | |
|---|---|---|
| 630,217 | 8/1899 | Hanstein . |
| 1,541,247 | 6/1925 | Brown . |
| 2,573,946 | 11/1951 | Armstead . |
| 2,840,924 | 7/1958 | Willis . |
| 3,998,003 | 12/1976 | Rosenbaum . |
| 4,232,473 | 11/1980 | Jenkins ............................ 446/119 X |
| 4,371,344 | 2/1983 | Gorczyca . |
| 4,583,956 | 4/1986 | Nelson ............................... 446/119 |
| 4,701,131 | 10/1987 | Hildebrandt et al. . |
| 4,705,250 | 11/1987 | Eastman . |
| 4,717,108 | 1/1988 | Liedle . |
| 4,731,962 | 3/1988 | Kittner et al. ................... 446/119 X |
| 4,934,638 | 6/1990 | Davis . |
| 4,997,375 | 3/1991 | Heinz ............................... 446/119 X |

Primary Examiner—Gene Mancene
Assistant Examiner—Jeffrey A. Smith
Attorney, Agent, or Firm—Morgan & Finnegan

[57] ABSTRACT

A device and method for illustrating geometric shapes are disclosed which enables individuals to study and visualize the interrelation between geometric shapes and more particularly complementary geometric shapes such as tetrahedrons. The apparatus includes a plurality of tubes that pass through a central support member. Cords pass through the tubes, each cord having its ends connected, forming a closed loop. The tubes are movable within the support member. As the tubes are manipulated, the size and geometry of the visualized shapes are altered. In one embodiment, four tubes and three cords define two complementary tetrahedrons. When the tubes are manipulated to expand one tetrahedron, the complementary tetrahedron shrinks.

15 Claims, 11 Drawing Sheets

FIG.11

GEOMETRIC DISPLAY DEVICE AND METHOD OF DEMONSTRATING GEOMETRIC SHAPES

FIELD OF THE INVENTION

The present invention relates to a device for demonstrating geometric shapes, and more particularly, for demonstrating the complementary nature of geometric shapes such as tetrahedrons. A plurality of tubes and cords extending through the tubes provide a visual and manipulable structure for illustrating the cooperation between geometric shapes.

BACKGROUND OF THE INVENTION

Prior art devices for educating individuals as to the multitude of possible geometric shapes and the mathematical theories that underlie the geometric shapes are well known. Many of these devices use struts and/or strings to demonstrate static geometric shapes.

Struts and strands are also used in the prior art to demonstrate the theories behind tension. U.S. Pat. No. 4,371,344, to Gorczyca, discloses three struts that are held in a geometric configuration by a plurality of tension strands. A removable block holds the struts in position while the tension strands are applied.

Although the known prior art discloses a variety of geometric display devices and multi-strut assemblies, nothing known in the prior art discloses or suggests a device where two or more geometric shapes displayed by the device can be readily changed relative to each other so that the relative changes in shape between the two can be visualized. No known prior art shows a device displaying two geometric shapes where one shape is expanded in size while the other shape is contracted. Also, the prior art fails to disclose or suggest a device where the geometric shape defined by cords can be rapidly varied such as by moving tubes relative to each other. It is believed that teaching of younger children is enhanced when visualized geometric shapes can be varied between different structures, such as a cubic structure and tetrahedrons.

SUMMARY OF THE INVENTION

It is therefore an object of the present invention to provide a device for demonstrating geometric shapes where the shapes can be quickly changed to allow one to study and visualize the interrelation between the various shapes.

It is still another object of the present invention to provide a device for demonstrating complementary geometric shapes where one shape expands in size while another shape decreases in size.

It is still another object of the present invention to provide a device for demonstrating complementary tetrahedrons that can be shaped to form a cube by manipulating the device.

Additional objects and advantages of the invention will be set forth in the description which follows and, in fact, will be obvious from the description and advantages being realized and attained by means of the instrumentation, facts, apparatus, systems, steps and procedures, particularly pointed out in the specification.

The present invention enables individuals to study and visualize the interrelation between geometric shapes and, more particularly, complementary tetrahedrons. In one preferred use, the invention is transformed from a pair of complementary tetrahedrons to a cube simply by manipulating the tubes of the device. Specifically, the cube in the illustrated embodiment of the present invention is a structure formed by a pair of regular tetrahedrons that are superimposed over each other. The tetrahedrons are equal in size, and the apex of one tetrahedron extends through the base of the other tetrahedron to form a symmetrical structure. The complementary tetrahedrons can be simultaneously shrunk and enlarged when the tubes are moved relative to each other.

The device includes a plurality of tubes that are positioned adjacent to each other in predetermined spatial orientation and movable relative to each other. A plurality of cords extends through the tubes to define a plurality of geometric shapes. Movement of one tube relative to the other tubes varies the geometric shapes displayed by the device.

In one embodiment, the device has a central support member through which the tubes extend and are movable. The central support member can be configured in many different shapes, such as a sphere, an octahedron, or an animal, e.g., a duck. The support member also could be formed as an assembly of hollow, support tubes.

In the illustrated embodiment, four tubes are used. Three cords extend through the tubes, each cord having its ends connected together forming a loop, and passing through each tube, thereby defining at least two complementary geometric tetrahedral shapes. As the tubes are manipulated, one tetrahedron expands and the other tetrahedron contracts. The tubes can be manipulated such that a cube is formed when the two tetrahedrons are superimposed over each other.

BRIEF DESCRIPTION OF THE DRAWINGS

The foregoing and other objects and advantages of the present invention will be appreciated more fully from the following description, with references to the accompanying drawings in which.

DETAILED DESCRIPTION OF THE INVENTION

Figure 1:
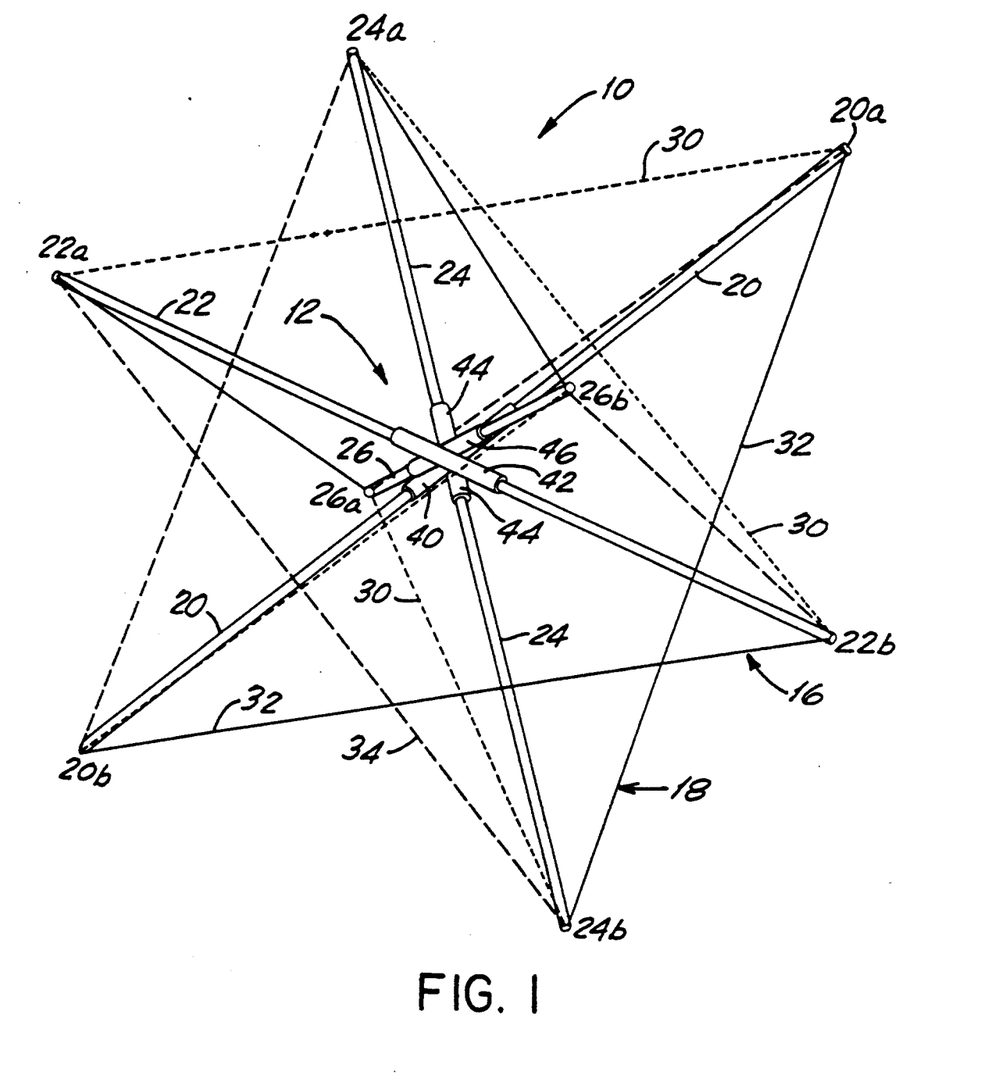
FIG. 1 is a schematic isometric view of the device using a central support, four tubes supported for movement in the central support, and three cords passing through each of the tubes.
Figure 3:
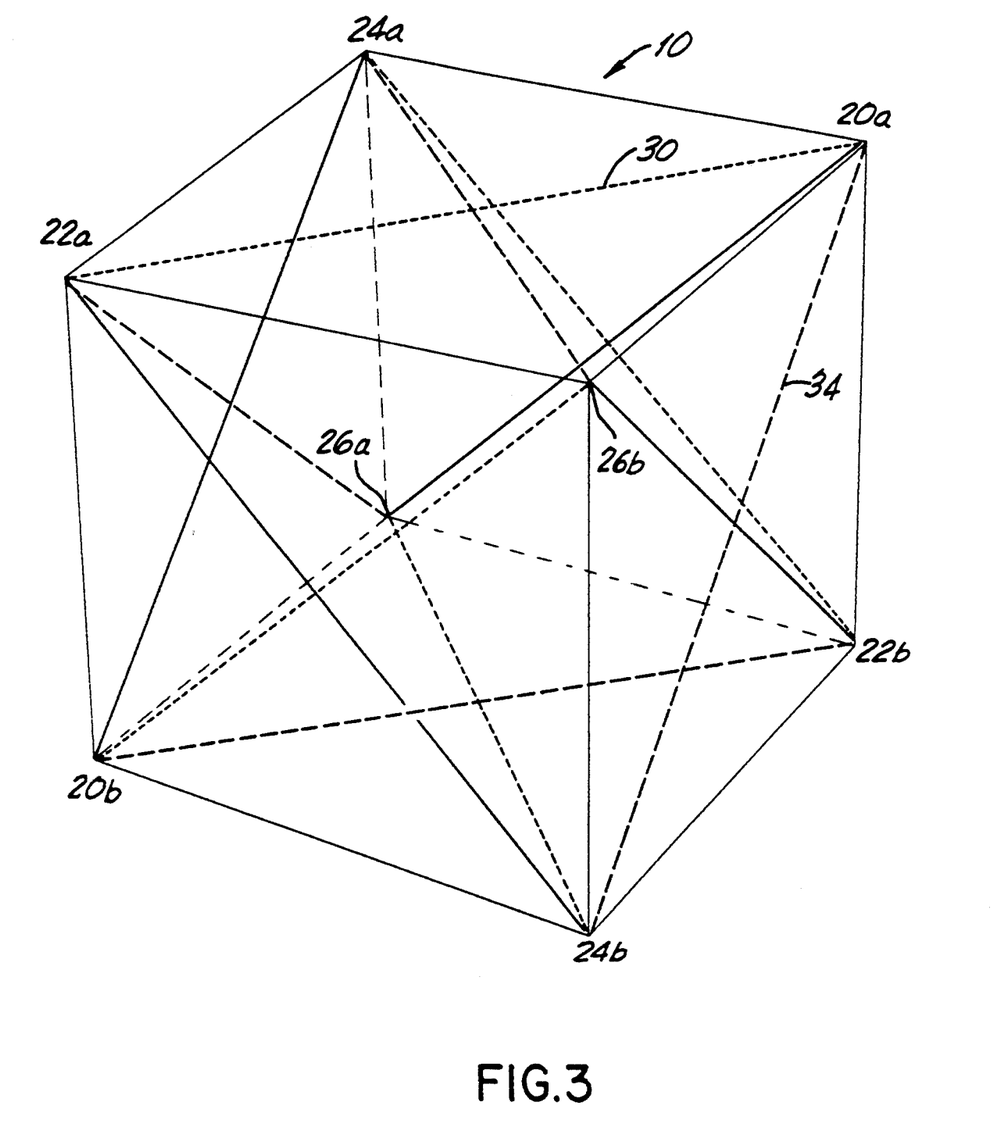
FIG. 3 is a schematic view similar to FIG. 2 showing the outline of a cube.
Figure 8:
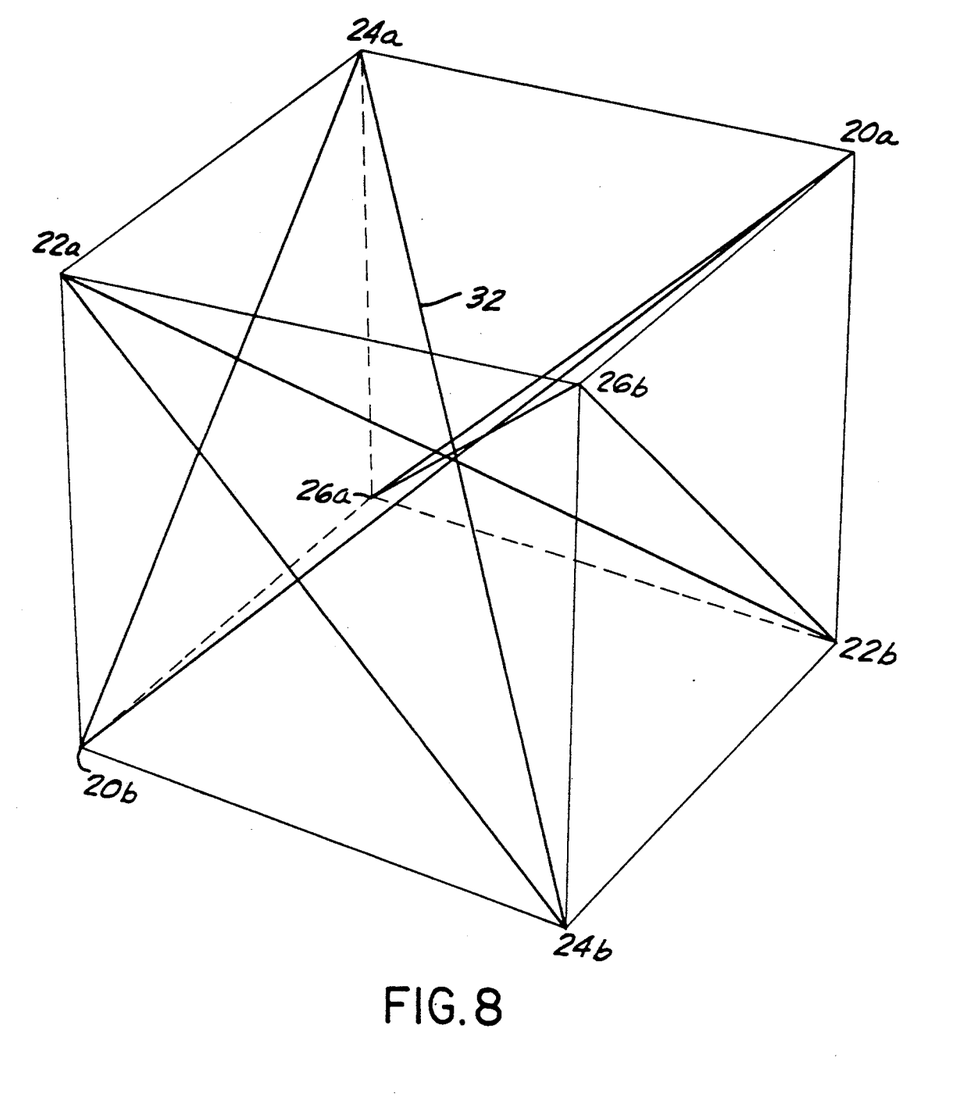
FIG. 8 is a schematic view showing the route of one cord when the tubes (not shown) are manipulated so that the cords form a cube.

Referring now to FIG. 1, there is illustrated generally at 10 one embodiment of the device of the present invention for demonstrating geometric shapes. The illustrated device 10 includes a central support member, indicated generally at 12, and a plurality of tubes passing through the support member 12. A plurality of cords formed as loops pass through the tubes and outline the shapes of complementary regular tetrahedrons 16, 18 which, when overlapped to each other, form a cube (FIGS. 3 and 8). More specifically, the illustrated device 10 includes four tubes 20, 22, 24, 26 and three cords of different colors 30, 32, 34 which have their individual ends connected together to form three looped cords, indicated by dashed, dotted and solid lines.

In the illustrated embodiment of FIG. 1, the support member 12 is formed from four support strut tubes 40, 42, 44 46 which are secured together by means such as glue. The tubes can be formed from a large number of different materials, but preferably they are formed from a lightweight material such as plastic. The support strut tubes 40-46 are dimensioned to allow the tubes 20-26 to pass through in a close clearance fit to permit movement of each tube within its respective support strut tube. The support strut tubes 40-46 are oriented in a predetermined fashion allowing the tubes 20-26 to be oriented in the same predetermined fashion.

Figure 6:
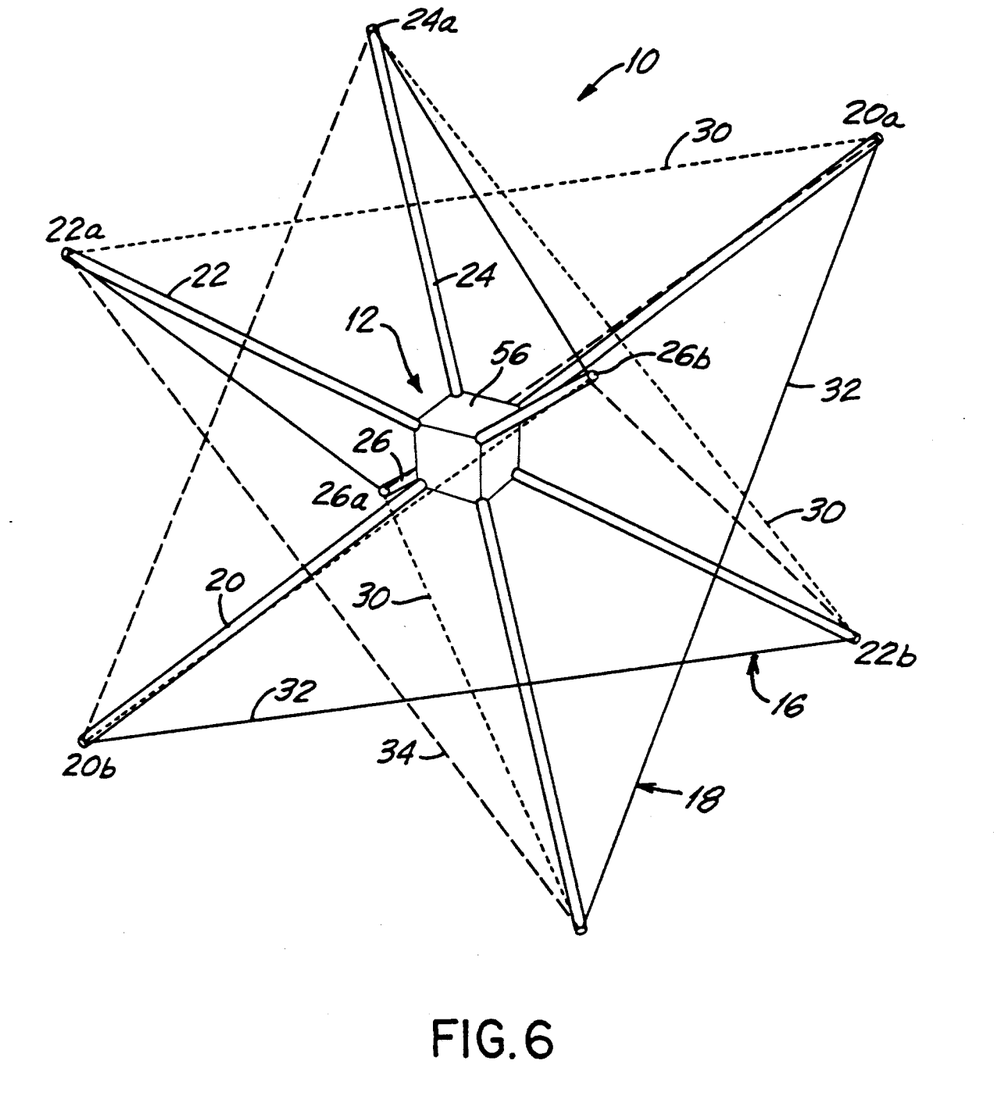
FIG. 6 is a view similar to FIG. 5 showing a cube as the central support member.

As a result of the predetermined orientation of the support strut tubes 40-46, the tubes 20-26 have a specific spatial orientation relative to each other. For purposes of description of this illustrated embodiment only, the first tube 20 will be considered as extending in a substantially vertical direction, and directed in the vertical plane. The drawings are not drawn to scale, but show the relationship between the tubes. The tubes are oriented such that the tubes would pass through the corners of a regular cube (FIG. 6).

Figure 4:
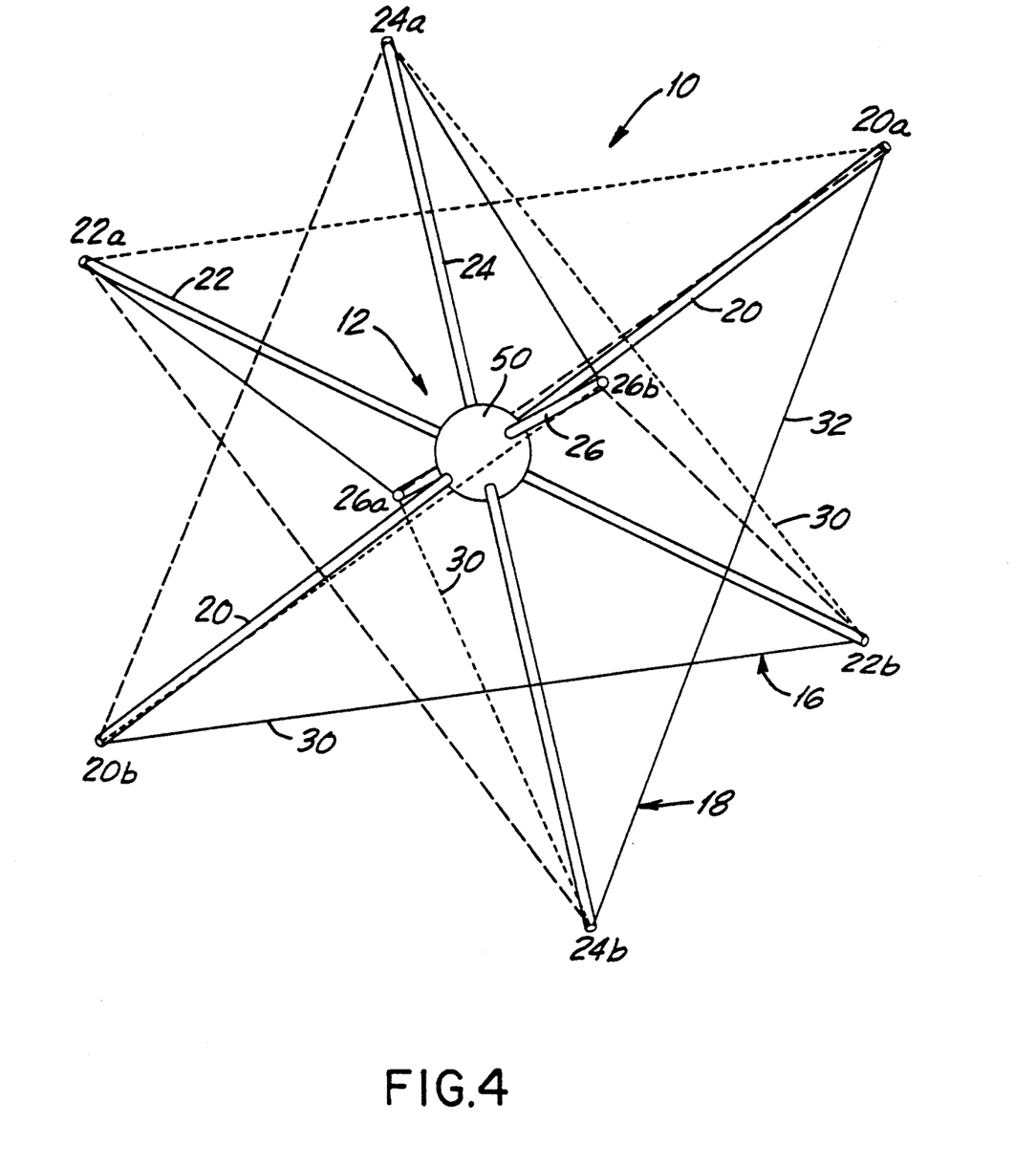
FIG. 4 is a schematic isometric view showing a sphere used as a center support.
Figure 5:
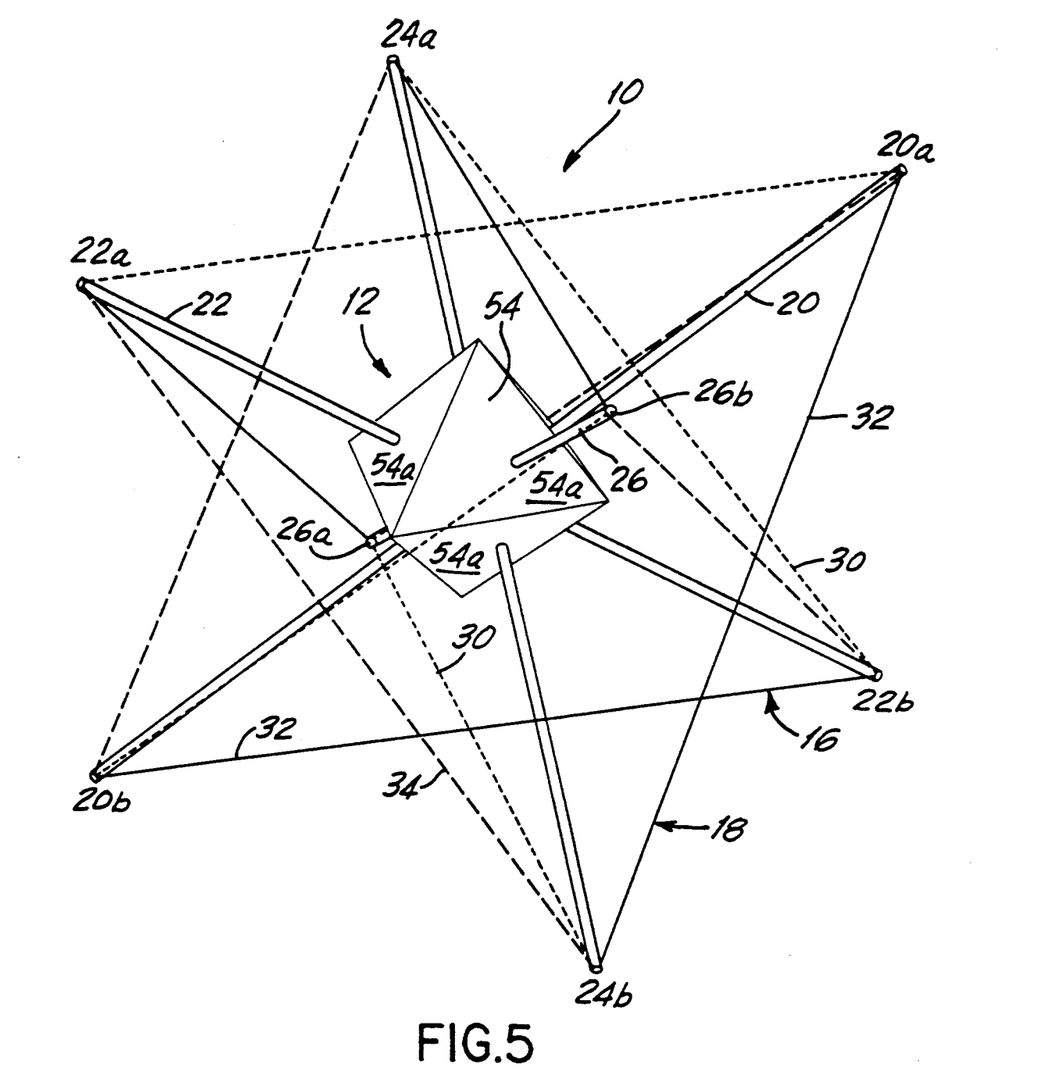
FIG. 5 is a schematic isometric view showing an octahedron of eight equilateral triangular faces used as a center support.
Figure 7:
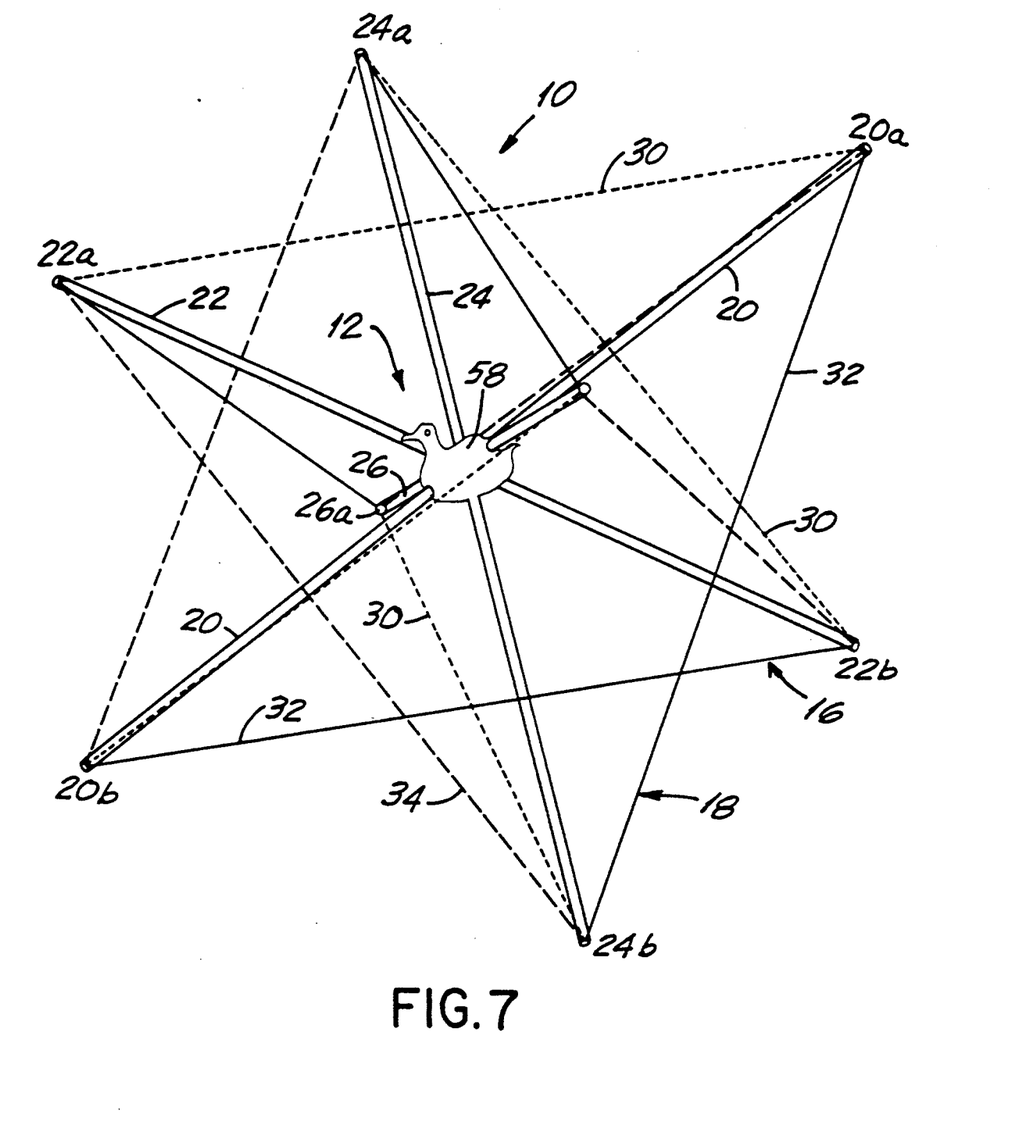
FIG. 7 is a view similar to FIG. 5 showing the central support member formed as a duck.

In another embodiment shown in FIG. 4, the support member is formed as a sphere 50 having holes through which the tubes pass. The sphere can be formed from many different materials; plastic is considered acceptable because it is lightweight and forms easily. The holes in the sphere are dimensioned to form a close interference fit with the tubes. FIG. 5 shows the center support 12 formed as a regular octahedron 54 having eight faces 54a, each face having the shape of an equilateral triangle. The tubes each pass through pairs of diametrically opposed faces. In FIG. 6, the tubes pass through diametrically opposed corners of a cube 56, while in FIG. 7, the support is formed as an animal 58, illustrated as a duck. The support 12 can be almost any shape as long as it will support the tubes for movement relative to each other.

The cords 30, 32, 34 pass through the tubes, with each cord being connected end-to-end to form a loop. The three cords 30-34 are preferably three different colors to aid in the visual effect produced by the device.

Figure 10A:
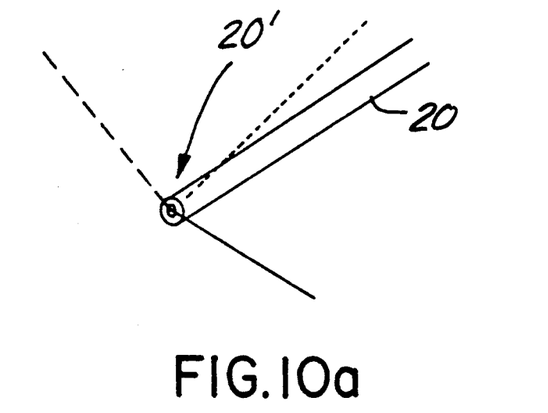
FIGS. 10a–10c show different configuration at the tube end through which a cord can exit from a tube.
Figure 10B:
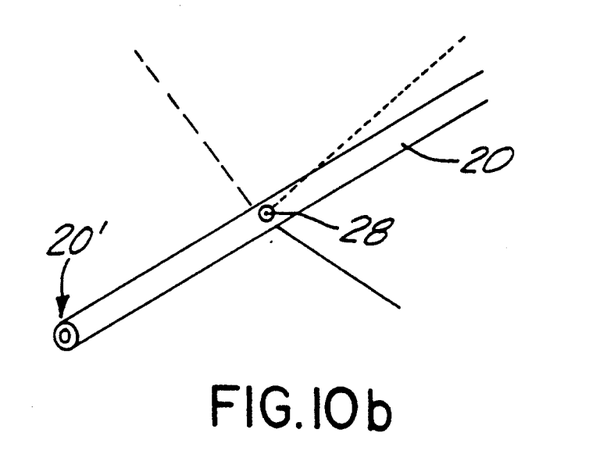
Figure 10C:
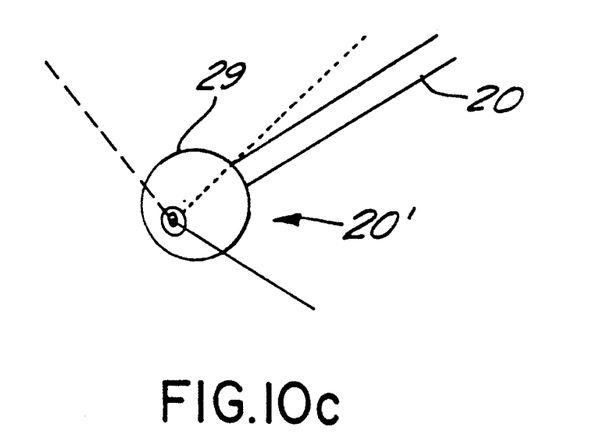

In the illustrated embodiment, the cords outline a pair of tetrahedrons 16, 18 formed by the device. In the embodiment illustrated in FIG. 1, cords 30-34 also aid in holding the tubes 20-26 in their desired positions. Specifically, the cords 30-34 connect the ends of the tubes 20-26 by passing through one tube, and then extending into an adjacent tube. The cords 30-34 connect the tubes in a specific pattern to produce the outlines of the illustrated complementary tetrahedrons 16, 18. The cords can be formed from a large number of different materials, such as string, twine, fishing line or any other flexible material as long as it can extend through the tubes and permit movement. The cords 30'34 can exit the tubes directly from the rear portion (FIG. 10a, the rear portion indicated generally by 20') or the cords can exit the tubes from holes positioned proximal to the distal end (FIG. 10b). The embodiment in FIG. 10b offers the advantage of keeping the distal end of the tube clear so that it can be grabbed by a user without interfering with the cords. FIG. 10c shows decorative balls positioned on the tube end through which the cord passes. The drawing shows balls for purposes of illustration; however, many different decorative shapes could be used.

Beginning at the first end 20a of the first tube 20, the first cord 30 extends to connect the first tube 20 with the first end 22a of second tube 22. The first cord 30 then passes through second tube 22, and extends from the second end 22b of second tube 22 to connect the second tube 22 with the first end 24a of the third tube 24. The first cord 30 passes through the third tube 24, and extends from the second end 24b of third tube 24 to connect the third tube 24 with the first end 26a of the fourth tube 26. The first cord 30 then passes through the fourth tube 26, and extends from the second end 26b of fourth tube 26 to connect the fourth tube 26 with the second end 20b of the first tube 20. The cord extends to its starting point at the first end 20a, forming a closed loop.

The second and third cords 32, 34 also extend through the tubes 20-26. Beginning at the first end 20a of the first tube 20, the second cord 32 extends to the second end 24b of the third tube 24. The second cord 32 then passes through the third tube 24 and extends from the first end 24a of the third tube 24 to connect the third tube 24 with the second end 26b of the fourth tube 26. The second cord 32 then passes through the fourth tube 26 and extends from the first end 26a of the fourth tube 26 to connect the fourth tube 26 with the first end 22a of the second tube 22. The second cord 32 then passes through the second tube 22 and extends from the second end 22b of the second tube 22 to connect the second tube 22 to the second end 20b of first tube 20. The cord passes through the tube 20, completing the loop.

Beginning at the first end 20a of the first tube 20 the third cord 34 connects the first tube 20 with the first end 26a of the fourth tube 26. The third cord 34 then passes through the fourth tube 26 and extends from the second end 26b of the fourth tube 26 to connect the fourth tube 26 with the second end 22b of the second tube 22. The third cord 34 then passes through the second tube 22 and extends from the first end 22a of the second tube 22 to connect the second tube 22 to the second end 24b of the third tube 24. The third cord 34 then passes through the third tube 24 and extends from the first end 24a of the third tube 24 to connect the third tube 24 to the second end 20b of the first tube 20. The third cord 34 then passes though the first tube 20, completing the loop.

Figure 2:
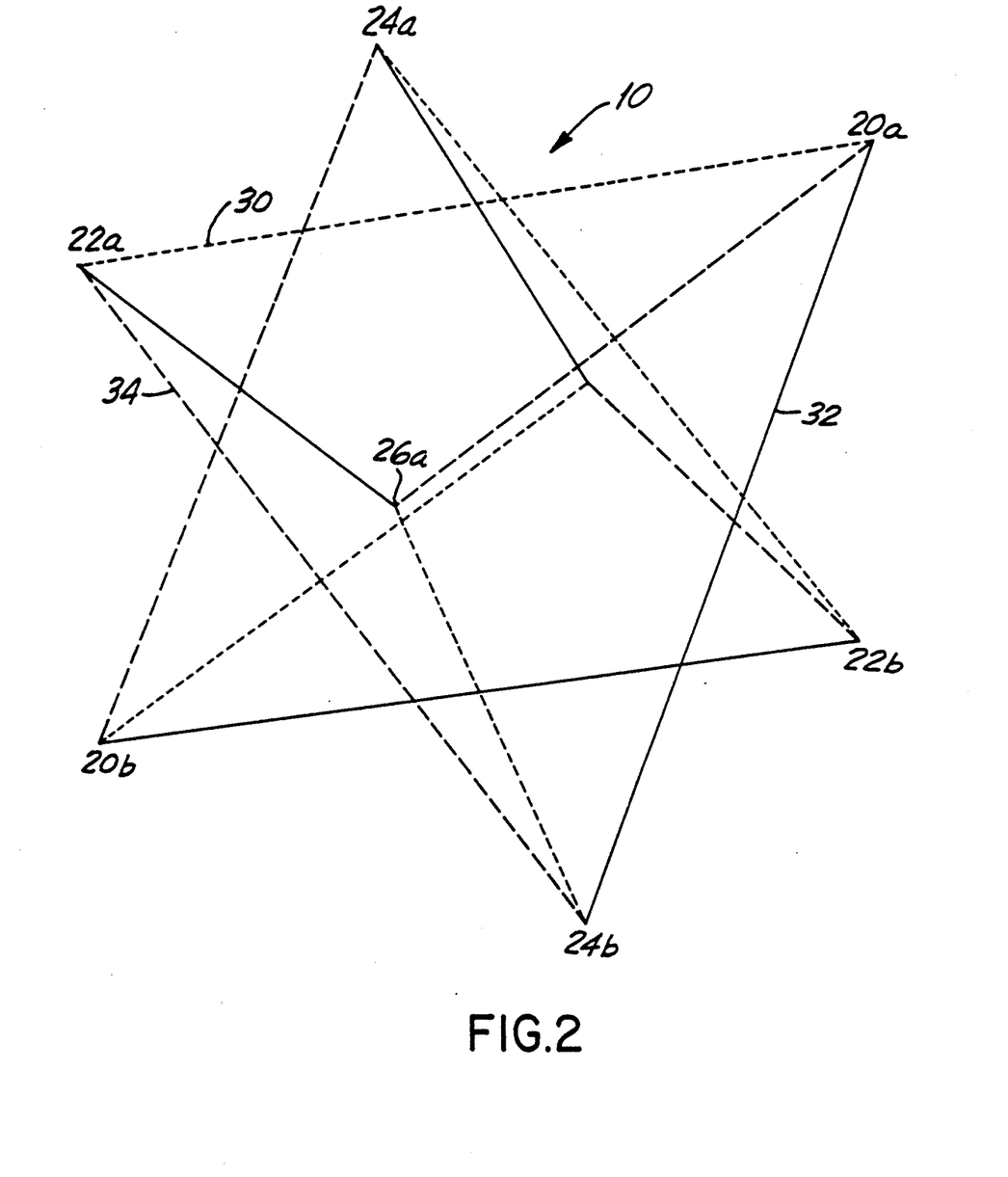
FIG. 2 is a schematic view without the central support and tubes showing the outline of two tetrahedrons.
Figure 9:
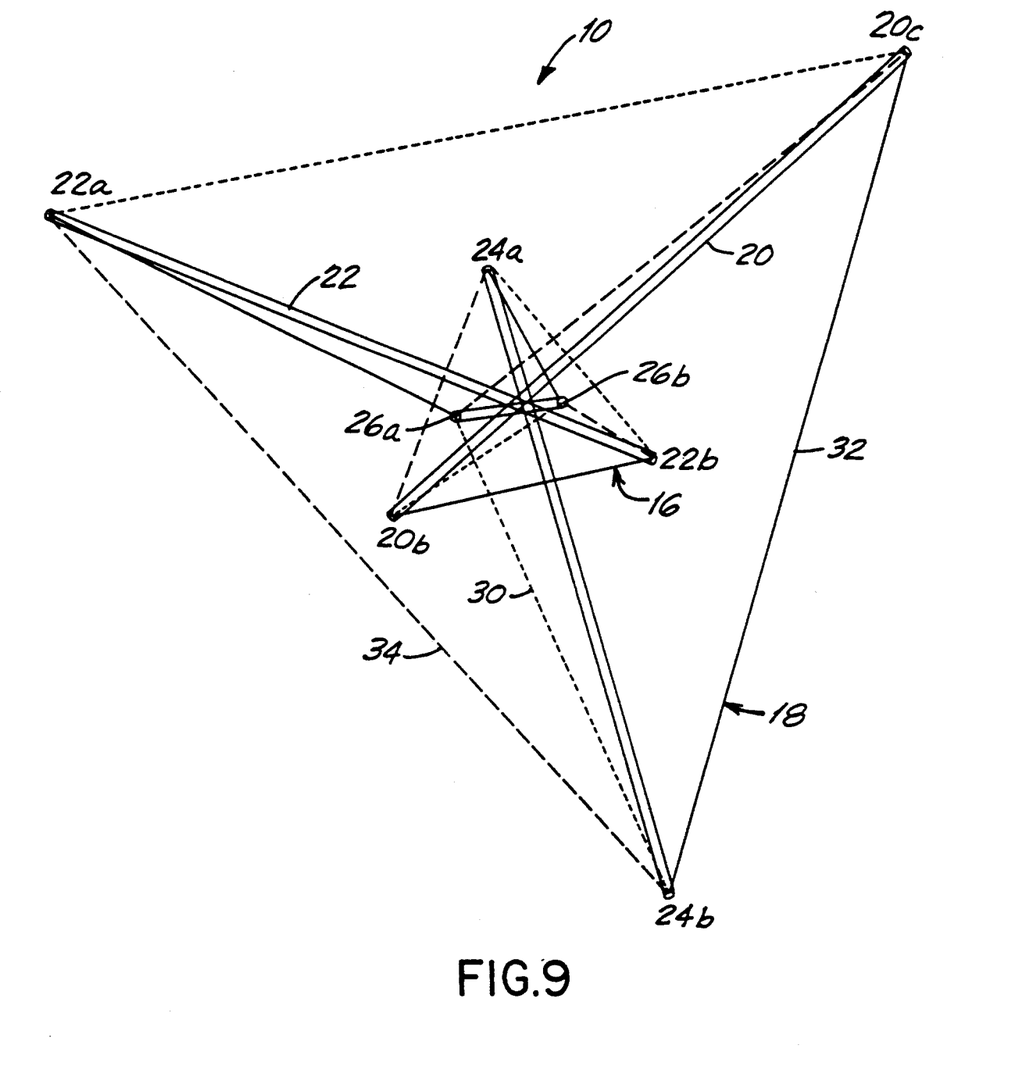
FIG. 9 is a schematic view showing the tubes positioned so that a large and small tetrahedron are formed.
Figure 11:
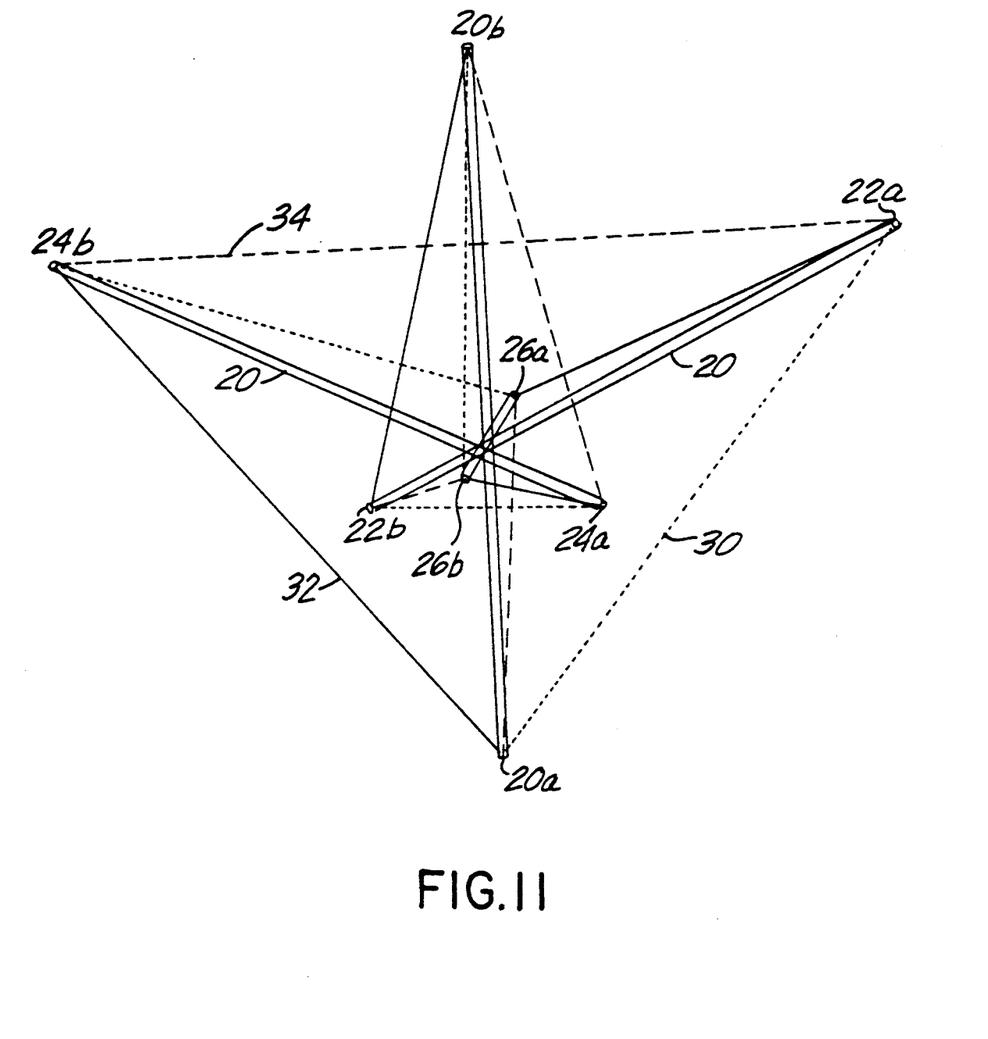
FIG. 11 is a schematic view showing the tubes positioned so that irregular geometric tetrahedron are produced.

The cord arrangement described above produces a device 10 displaying a pair of complementary tetrahedrons 16, 18, that are shown in outline form in FIG. 2 (forming overlapping tetrahedrons as a cube image as shown in FIG. 3.) In operation, when one tube is moved relative to the support member 12, the size of the tetrahedrons varies in a complementary manner (FIG. 9). For example, if the tubes are pulled in the direction of the tapered end of one tetrahedron, that tetrahedron will shrink while the complementary tetrahedron will expand. This also applies to irregular tetrahedrons produced and displayed by the present invention. FIG. 11 shows the embodiment described above where the tubes are oriented so that irregular geometric shapes are defined.

It should be noted that the description above represents one embodiment of the present invention, but it could be varied without departing from the spirit of the invention. Other shapes could be displayed depending on the number, orientation and length of the tubes. Additionally, the support member could be manufactured in a variety of shapes, and the holes could direct the tubes in a variety of spatial orientations. Further, the device need not be used only as a geometric shape display device. The uses of such device could extend beyond use as an educational aid for displaying different geometric shapes.

It should be understood that the foregoing description of the invention is intended merely to be illustrative thereof, and that other embodiments, modifications, and equivalents may be apparent to those skilled in the art without departing from its spirit.

I claim:

1. A device for demonstrating geometric shapes comprising
   a support,
   a plurality of tubes supported by and extending through said support and being positioned adjacent to each other in a predetermined spatial orientation and movable relative to the support and to each other,
   a plurality of cords extending through said tubes thereby defining a plurality of geometric shapes,
   wherein movement of said tubes relative to the support and to each other varies the geometric shapes displayed by said cords.

2. A device according to claim 1, wherein said cords define two tetrahedrons.

3. A device according to claim 1, wherein said cords define two geometric shapes, wherein as one shape contracts in size, the other shape expands in size.

4. A device according to claim 3 wherein said geometric shapes are two tetrahedrons such that as one contracts, the other expands.

5. A device according to claim 1 wherein each cord is a different color from other cords.

6. A device according to claim 1 wherein each of said cords passes through each of said tubes.

7. A device according to claim 1 wherein each of said cords has its two ends connected, forming a closed loop.

8. A device according to claim 1 wherein each of said cords exits the tube at the tube distal end.

9. A device according to claim 1 wherein each of said tubes includes an opening proximal to the distal end, and wherein each of said cords exits said tube at said opening.

10. A device according to claim 1 wherein said tubes includes a ball positioned at each tube end through which said cords pass.

11. A device for demonstrating geometric shapes, comprising
    a support
    at least four tubes supported by and extending through said support and being positioned in a predetermined spatial orientation adjacent each other and movable relative to the support and to each other, and
    at least three cords extending through said tubes, thereby defining at least two complementary geometric shapes,
    wherein movement of said tubes relative to the support and to each other varies the geometric shapes displayed by said cords.

12. A device according to claim 11 wherein each of said cords passes through each of said tubes.

13. A device according to claim 11, wherein each of said cords has its two ends connected, forming a closed loop.

14. A method for demonstrating geometric shapes comprising,
    providing a plurality of tubes extending through and supported by a support and being positioned adjacent to each other in a predetermined spatial orientation and being movable relative to each other, and a plurality of cords extending through the tubes, each cord having its two ends connected, forming a closed loop, and
    changing the geometric shapes displayed by the cords by moving the tubes relative to the support and to each other.

15. A method according to claim 14 wherein the method includes the further step of manipulating the tubes and contracting the size of one tetrahedron while expanding the size of the other tetrahedron.

* * * * *